(12) United States Patent
Ono

(10) Patent No.: US 7,747,880 B2
(45) Date of Patent: Jun. 29, 2010

(54) INFORMATION PROCESSING APPARATUS AND PROGRAM FOR CAUSING COMPUTER TO EXECUTE POWER CONTROL METHOD

(75) Inventor: Yoshiyuki Ono, Hino (JP)

(73) Assignee: Seiko Epson Corporation, Tokyo (JP)

( * ) Notice: Subject to any disclaimer, the term of this patent is extended or adjusted under 35 U.S.C. 154(b) by 590 days.

(21) Appl. No.: 11/476,044

(22) Filed: Jun. 28, 2006

(65) Prior Publication Data

US 2007/0016810 A1    Jan. 18, 2007

(30) Foreign Application Priority Data

Jun. 30, 2005   (JP)   ............... 2005-191123

(51) Int. Cl.
G06F 1/00       (2006.01)
G06F 11/00      (2006.01)

(52) U.S. Cl. ................ 713/300; 700/94; 714/17; 714/100

(58) Field of Classification Search .......... 713/300, 713/324; 700/94; 714/17, 100
See application file for complete search history.

(56) References Cited

U.S. PATENT DOCUMENTS

| 5,452,401 | A | * | 9/1995 | Lin ............ 713/322 |
| 5,787,297 | A | | 7/1998 | Lin |
| 5,798,961 | A | * | 8/1998 | Heyden et al. ......... 365/52 |
| 6,535,985 | B1 | | 3/2003 | Oshima et al. |
| 6,782,483 | B2 | | 8/2004 | Oshima et al. |
| 6,789,207 | B1 | | 9/2004 | Maejima |
| 6,792,552 | B2 | | 9/2004 | Oshima et al. |
| 6,795,929 | B2 | | 9/2004 | Oshima et al. |
| 6,804,791 | B2 | | 10/2004 | Oshima et al. |
| 6,839,855 | B2 | | 1/2005 | Oshima et al. |

(Continued)

FOREIGN PATENT DOCUMENTS

JP    A-02-162457    6/1990

(Continued)

OTHER PUBLICATIONS

Dec. 23, 2009 Extended European Search Report issued in EP 06013482.2-1243 / 1739523.

*Primary Examiner*—Vincent T Tran
(74) *Attorney, Agent, or Firm*—Oliff & Berridge, PLC

(57) ABSTRACT

An information processing apparatus that has multiple functional parts and power management domains that serve as control units when supplying power to the functional parts, and that autonomously controls supply of power to the power management domains, the apparatus including a power supply control part that supplies power to only a power management domain that includes the functional part associated with execution of an input instruction, and that stops the power supply to the power management domain in response to termination of execution of an instruction by the functional part; and an execution result storage part that stores a result generated by execution of an instruction by the power management domain to which power is supplied by the power supply control part, independently of the power supply control part supplying power and stopping the supply of power; wherein, after supply of power to a power management domain that terminates execution of an instruction is stopped by the power supply control part, another power management domain to which power is supplied reads out a result that is stored in the execution result storage part.

8 Claims, 9 Drawing Sheets

U.S. PATENT DOCUMENTS

| | | | |
|---|---|---|---|
| 6,882,389 B2 | 4/2005 | Oshima et al. | |
| 6,909,483 B2 | 6/2005 | Oshima et al. | |
| 6,941,481 B2 | 9/2005 | Oshima et al. | |
| 6,952,248 B2 | 10/2005 | Oshima et al. | |
| 6,952,787 B2 | 10/2005 | Oshima et al. | |
| 6,971,037 B2 | 11/2005 | Oshima et al. | |
| 6,990,595 B2 | 1/2006 | Oshima et al. | |
| 7,006,181 B2 | 2/2006 | Oshima et al. | |
| 7,024,572 B2 | 4/2006 | Oshima et al. | |
| 7,062,667 B2 | 6/2006 | Oshima et al. | |
| 7,073,084 B2 | 7/2006 | Oshima et al. | |
| 7,079,108 B2 | 7/2006 | Oshima et al. | |
| 7,080,272 B2 | 7/2006 | Oshima et al. | |
| 7,082,543 B2 * | 7/2006 | Lin | 713/320 |
| 7,120,809 B2 | 10/2006 | Oshima et al. | |
| 7,184,003 B2 * | 2/2007 | Cupps et al. | 345/30 |
| 7,213,162 B2 | 5/2007 | Oshima et al. | |
| 7,256,788 B1 * | 8/2007 | Luu et al. | 345/501 |
| 7,321,975 B2 * | 1/2008 | Park et al. | 713/324 |
| 7,383,456 B2 * | 6/2008 | Ono | 713/320 |
| 7,428,650 B2 * | 9/2008 | Kardach et al. | 713/323 |
| 7,432,921 B2 | 10/2008 | Oshima et al. | |
| 2002/0053037 A1 * | 5/2002 | Lee | 713/300 |
| 2002/0087225 A1 * | 7/2002 | Howard | 700/94 |
| 2002/0124209 A1 * | 9/2002 | Faust et al. | 714/37 |
| 2003/0100963 A1 * | 5/2003 | Potts et al. | 700/83 |
| 2003/0135778 A1 | 7/2003 | Kitajima et al. | |
| 2003/0193466 A1 | 10/2003 | Oshima et al. | |
| 2004/0075622 A1 * | 4/2004 | Shiuan et al. | 345/1.1 |
| 2004/0078607 A1 | 4/2004 | Feng | |
| 2004/0150661 A1 | 8/2004 | Park et al. | |
| 2005/0114570 A1 * | 5/2005 | Chang et al. | 710/62 |
| 2005/0128176 A1 | 6/2005 | Oshima et al. | |
| 2005/0128177 A1 | 6/2005 | Oshima et al. | |
| 2005/0128179 A1 | 6/2005 | Oshima et al. | |
| 2005/0168400 A1 | 8/2005 | Oshima et al. | |
| 2006/0010283 A1 | 1/2006 | Ono | |
| 2006/0026445 A1 | 2/2006 | Ono | |
| 2007/0028086 A1 | 2/2007 | Oshima et al. | |
| 2007/0061560 A1 | 3/2007 | Oshima et al. | |
| 2007/0061604 A1 | 3/2007 | Oshima et al. | |
| 2007/0136566 A1 | 6/2007 | Oshima et al. | |

FOREIGN PATENT DOCUMENTS

| | | |
|---|---|---|
| JP | A-04-211819 | 8/1992 |
| JP | A 9-114557 | 5/1997 |
| JP | A-2004-215800 | 8/2004 |
| JP | A 2004-295193 | 10/2004 |
| JP | A 2006-23919 | 1/2006 |
| JP | A 2006-48190 | 2/2006 |
| JP | A 2006-48570 | 2/2006 |
| TW | 588236 B | 5/2004 |

* cited by examiner

F I G. 1
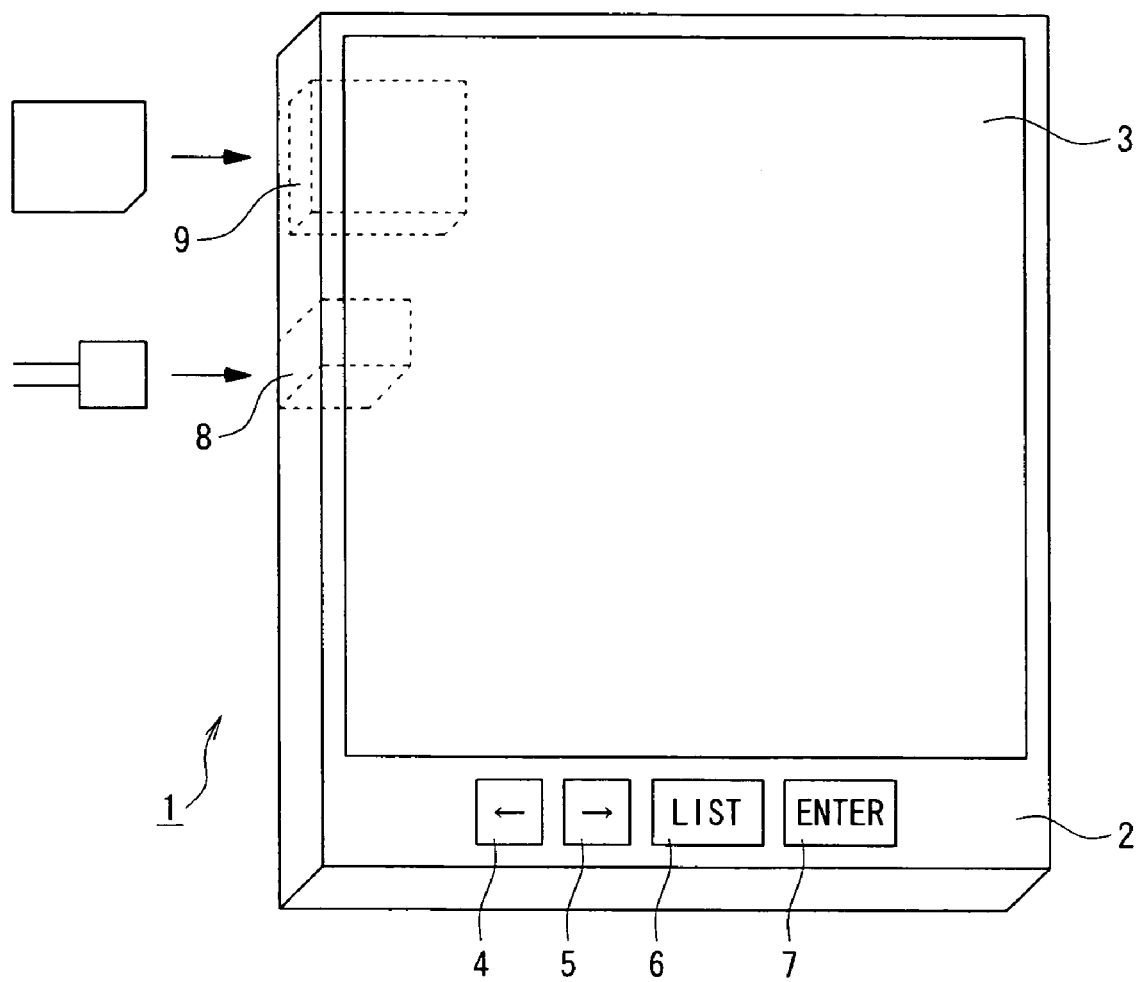

*FIG. 5*

| ADDRESS | MEMORY CONTENTS | MEANING |
|---|---|---|
| 0x00020000 | COMPRESSED DATA | ~604 |
| 0x10010000 | GPU WORK MEMORY | ~605 |
| 0x10020000 | EXPANSION DATA | ~606 |
| 0x20010000 | 0x00000001 | Decode INSTRUCTION |
| | 0x00020000 | SrcAdrs=0x00020000 |
| | 0x10020000 | DstAdrs=0x10020000 |
| | 0x10010000 | WorkAdrs=0x10010000 |
| | 0x00010000 | WorkSize=0x10000 |
| | 0x00000003 | SetDrawMode INSTRUCTION |
| | 0x00000000 | DrawMode=0 (PUT mode) |
| | 0x00000002 | DrawImage INSTRUCTION |
| | 0x10020000 | SrcAdrs=0x10020000 |
| | 0x00000064 | StartX=100 |
| | 0x00000064 | StartY=100 |
| | 0x000000C8 | Width=200 |
| | 0x000000C8 | Height=200 |
| | 0x0000012C | DstX=300 |
| | 0x0000012C | DstY=300 |
| | 0xFFFFFFFF | Finish |
| 0x20020000 | TERMINATION STATUS (LOG) | ~602 |

601 (pointing to instruction block)

F I G. 6

| COMMAND | ARGUMENT | EXPLANATION |
|---|---|---|
| Decode (0x00000001) | SrcAdrs DstAdrs WorkAdrs WorkSize | Expands compressed data stored at address specified by SrcAdrs at address specified by DstAdrs. At that time, uses memory of WorkSize byte amount from address specified by WorkAdrs as work memory. When work memory is insufficient, outputs error code 0x10000001 to log. When execution ended normally, outputs termination code 0x00000000 to log. |
| DrawImage (0x00000002) | SrcAdrs StartX StartY Width Height DstX DstY | Treats data stored at address specified by SrcAdrs as image data, and extracts rectangular region of width "Width" and height "Height" from coordinates (Start X, Start Y) within that image, and draws rectangular region of width "Width" and height "Heighet" from coordinates (Dst X, Dst Y) on screen. Log is not output, as execution always terminates normally. |
| SetDrawMode (0x00000003) | DrawMode | Specifies method for overlapping foreground image (drawing object) and background image with DrawMode. 0:PUT (overwrite background image), 1:OR (draw when there are pixels in either image), 2:AND (only draw when there are pixels in each image); 3:XOR(only draw when there are pixels in one of the images = inversion effect) |
| .... | .... | |
| Finish (0xFFFFFFFF) | | Terminates command execution. |

INFORMATION PROCESSING APPARATUS AND PROGRAM FOR CAUSING COMPUTER TO EXECUTE POWER CONTROL METHOD

The entire disclosure of Japanese Patent Application No. 2005-191123, filed Jun. 30, 2005 is expressly incorporated by reference herein.

BACKGROUND OF THE INVENTION

1. Field of the Invention

The present invention relates to an information processing apparatus capable of autonomously controlling the supply of power within the apparatus and a program for causing a computer to execute a power control method.

2. Description of the Related Art

Recently, in the field of computer system technology, power control technology is being developed that reduces power consumption when an apparatus is on standby by instantly restarting the power supply when the necessity to perform processing arises upon an input operation or the like being carried out with respect to the apparatus when the power supply within the apparatus had been stopped when processing was not being performed.

For example, technology is known that, for a portable device such as a PDA (Personal Digital Assistant), attempts to reduce power consumption during standby by causing the CPU to operate at a low frequency and automatically shift to a low power consumption mode that cuts the power supply to peripheral circuits when an operation is not performed for a certain period, and then return to a normal state to perform processing when an operation is performed.

Further, ordinary PCs (personal computers) are equipped with a function such as a suspend mode or standby mode, and these functions are effective in reducing unnecessary power consumption when a device is not being used for a long period, particularly in a device such as a notebook PC that is driven by a battery.

In a suspend mode or a standby mode, in many cases the CPU and a control part that is subordinate to the CPU alternately enter a standby state or an operating state. At that time, the CPU sends a control instruction to the subordinate control part and enters a standby state. The control part operates in accordance with the instruction and also writes the operation result in a register or the like after the operation is completed and then stops. Upon returning to an operating state from the standby state, the CPU determines the result of the operation from the contents written in the register or the like and then moves to the next control.

In this connection, technology relating to power control such as a suspend mode or a standby mode is disclosed in JP-A-9-114557.

SUMMARY OF THE INVENTION

However, the refinement of semiconductor processes has been proceeding in recent years and this has led to a rise in leak current. Therefore, even when the conventional technology for this type of standby mode is used, there is sometimes a problem concerning power consumption caused by leak current from the CPU during standby when the CPU is in a HALT state.

Consequently, in recent years technology has also been proposed that establishes a period in which power is supplied to only one part of the apparatus, and completely stops the power supply to other parts during that period. This technology makes it possible to obtain a particularly high power saving effect when it is applied, for example, to an electronic book apparatus or the like that uses a memory liquid crystal display in which the standby time until an operation is performed is relatively long.

However, when the conventional technology is applied to technology that completely stops the power supply to one part of an apparatus, information concerning an operation result that was stored in a register is lost when the power supply to the subordinate control part is stopped. Consequently, when an error or the like occurs during an operation performed by control of the control part, it can be considered that the CPU cannot know that the error occurred or the cause thereof. This represents an obstacle to correcting the result of the error and issuing an instruction to restart operation.

The present invention was made in view of the above circumstances, and an object of this invention is to provide an information processing apparatus that stops a power supply to one part of the apparatus to reduce power consumption, wherein a part to which the power supply was stopped can know the result of an operation performed by means of control by another part, as well as a program for causing a computer to execute a power control method.

In order to solve the above described problem, an information processing apparatus according to this invention has multiple functional parts and power management domains that serve as control units when supplying power to the functional parts, and autonomously controls a supply of power to the power management domains, the apparatus comprising: a power supply control part that supplies power to only a power management domain that includes the functional part associated with execution of an input instruction, and stops supplying power to the power management domain in response to termination of execution of the instruction by the functional part; and an execution result storage part that stores a result generated by execution of an instruction by the power management domain to which power is supplied by the power supply control part, independently of the power supply control part supplying power or stopping the supply of power; wherein after the power supply control part stops supplying power to a power management domain that finished execution of an instruction, another power management domain to which power is supplied reads out a result that is stored in the execution result storage part.

According to this invention, it is possible to supply power to only a power management domain that includes a functional part associated with execution of an input instruction, and to stop the power supply to the power management domain in response to terminating execution of the instruction. It is therefore possible to effectively reduce the power consumption of the overall apparatus by completely stopping the power supply to a power management domain that is not operating.

Further, a result generated by execution of an instruction by a power management domain to which power was supplied by the power supply control part can be stored independently of the power supply control part supplying power or stopping the supply of power. Thus, after the power management domain executes an instruction, the result of executing the instruction can be stored even after the power supply to the power management domain is completely stopped. Furthermore, since another power management domain to which power is supplied can read out the stored result, whether or not the instruction was properly executed can be determined by subsequent processing to enable a response for dealing with improper termination of the instruction.

According to this invention, an information processing apparatus can be provided that reduces power consumption by stopping a power supply to one part of the apparatus, wherein, for example, one control part such as a main control part can know the result of an operation that is carried out by control by another control part such as a control part used exclusively for drawing.

According to the information processing apparatus of this invention, the execution result storage part is a non-volatile memory device or a volatile memory device equipped with a power source which stores a result generated by execution of an instruction even after the power supply control part stops the power supply to the power management domain that executed the instruction.

According to this invention, by using a non-volatile memory device in an execution result storage part, it is possible to store a result of an executed operation in a state in which a power source for the execution result storage part is stopped and power is not consumed. Further, by using a volatile memory device equipped with a power source in an execution result storage part, the execution result storage part can be simply configured at a comparatively low cost.

Further, according to the information processing apparatus of this invention, the power supply control part supplies power to a power management domain that finished execution of an instruction during a period in which the power management domain writes a result generated by execution of the instruction in the execution result storage part, and stops the power supply to the power management domain after the result is written.

According to this invention, a result generated by execution of an instruction can be surely written in a power management domain. Further, the power supply to the power management domain can be stopped after the result is written to enable power saving in the apparatus overall.

Further, according to the information processing apparatus of this invention, the power management domain and the execution result storage part are connected by a bus, and the power management domain acquires authorization using the bus to write a result generated by execution of an instruction in the execution result storage part.

According to this invention, the power management domain can itself write a result generated by execution of an instruction in the execution result storage part. Thus, the load applied to the main control part can be reduced. Also, since it is not necessary to activate the main control part each time a result of executing an instruction is written, the supply of power and stopping the supply of power can be effectively controlled.

The information processing apparatus according to this invention further comprises a write control part for writing a result generated by execution of an instruction in the execution result storage part, and when a power management domain is connected with the write control part via a bus, the power management domain writes a result using a bus protocol that is established between the power management domain and the write control part.

According to this invention, since a write control part can be externally attached to a power management domain, the information processing apparatus of this invention can be realized without changing the existing configuration of a power management domain.

Further the information processing apparatus according to this invention is characterized in that at least one of the power management domains sets an area in the execution result storage part in which a result generated by execution of an instruction by the power management domain is to be written.

According to this invention, the memory space of the entire apparatus can be utilized more flexibly.

A program for causing a computer to execute a power control method for an information processing apparatus according to this invention is a program that causes a computer to execute a power control method, which has multiple functional parts and power management domains that serve as control units when supplying power to the functional parts, and which autonomously controls a supply of power to the power management domains, the method comprising: a result reading step in which one of the power management domains reads out a result generated by execution of an instruction by another power management domain from a non-volatile memory device; an execution determination step for determining whether or not execution of an instruction was performed normally on the basis of a result that is read out in the result reading step; a next instruction step for writing an instruction to be executed next in the non-volatile memory device based on a result of determining whether or not an instruction was executed normally in the execution determination step; and a power supply stopping step for stopping a supply of power to the one power management domain after completion of the next instruction step.

According to this invention, one power management domain can read out a result generated by execution of an instruction by another power management domain from a non-volatile memory device and determine whether or not execution of the instruction was carried out normally based on the result that is read out. Further, the power management domain can write the next instruction based on the result of determining whether or not the instruction was executed normally and stop the power supply to itself. It is therefore possible to stop the power supply to a power management domain that issued an instruction for another power management domain after the instruction was issued, and to completely stop the power supply to a power management domain that is not operating to thereby effectively reduce the power consumption for the apparatus overall.

BRIEF DESCRIPTION OF THE DRAWINGS

FIG. 1 is a view showing the external configuration of an information processing apparatus according to an embodiment of this invention;

FIG. 5 is a view that specifically shows one part of the memory space shown in FIG. 4;

FIG. 6 is a table that illustrates the meaning of the main commands among the commands included in the drawing instructions shown in FIG. 5;

DETAILED DESCRIPTION OF THE PREFERRED EMBODIMENTS

Figure 2:
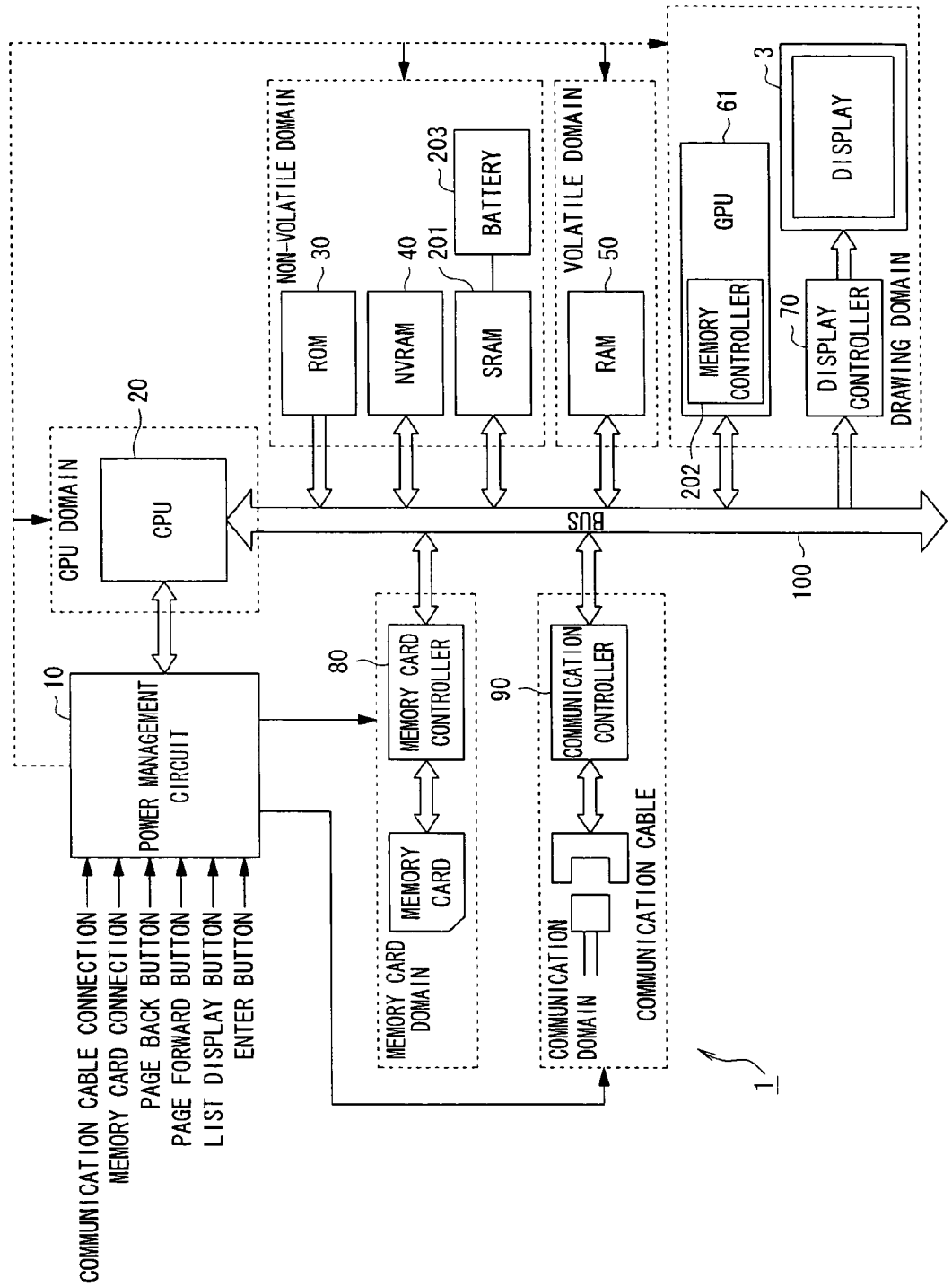
FIG. 2 is a functional block diagram showing an internal configuration of the information processing apparatus shown in FIG. 1.

Hereunder, an embodiment of the information processing apparatus and the program for causing a computer to execute a power control method according to this invention is described with reference to the drawings.

First, the configuration will be described.

FIG. 1 is a view showing the external configuration of an information processing apparatus 1 according to this invention.

In this embodiment, a case is described in which the information processing apparatus 1 is configured as an electronic book reader for viewing the contents of an electronic book.

In FIG. 1, the information processing apparatus 1 is composed by a main body 2, a display 3, a page back button 4, a page forward button 5, a list display button 6, an enter button 7, a communication connector 8, and a memory card slot 9.

The main body 2 comprises various functional parts that constitute the information processing apparatus 1: the display 3, the page back button 4, the page forward button 5, the list display button 6 and the enter button 7 are provided on the front thereof, and the communication connector 8 and the memory card slot 9 are provided on the left side thereof. Further, the main body 2 internally comprises devices for realizing various functions, such as a CPU 20 and a display controller 70 that are described later.

The display 3 is composed by, for example, an A4-sized high pixel density (high pixel count) display device, and displays pixel data at predetermined pixels in response to control by the display controller 70.

The display 3 is a memory display device (a display device that maintains the display screen even when the power is stopped). Thus, since power is not required to maintain the state of a display screen, the information processing apparatus 1 has still lower power consumption.

For example, an electrophoretic display, a cholesteric liquid crystal display, a display utilizing charged toner, a display utilizing a twist ball, or an electrodeposition display or the like can be employed as the display 3.

The page back button 4 is a button for returning the page that is currently displayed to the preceding page, and the page forward button 5 is a button for advancing the currently displayed page.

The list display button 6 is a button for displaying a list of pages included in contents stored in a memory card. In this connection, data in which the screen of each page has been reduced (hereunder, referred to as "reduced screen data") is stored as pages for list display in the contents stored on the memory card.

The enter button 7 is a button that allows a user to select a page to be displayed over the whole screen.

A button-depression signal from the page back button 4, the page forward button 5, the list display button 6 or the enter button 7 is input to the CPU 20 via a power management circuit 10 that is described later.

The communication connector 8 is a connector for connecting a USB (Universal Serial Bus) cable. Sending or receiving of information or receipt of power supply can be carried out through a communication cable connected to the communication connector 8.

The memory card slot 9 is an interface for reading from and writing to a memory card. When a memory card on which the contents of an electronic book are stored is inserted into the memory card slot 9, the contents stored on that memory card can be read.

FIG. 2 is a functional block diagram showing the internal configuration of the information processing apparatus 1.

In FIG. 2, the information processing apparatus 1 is composed by the power management circuit 10, the CPU (Central Processing Unit) 20, a ROM (Read Only Memory) 30, an NVRAM (Non-volatile RAM) 40, a RAM 50, a graphics processing unit (hereunder, referred to as "GPU") 61, a display controller 70, a memory card controller 80 and a communication controller 90 and the like. Each of these parts other than the power management circuit 10 is connected by a bus 100. The power management circuit 10 is connected directly to the CPU 20. The power management circuit 10 is also connected to each power management domain (described later) by a power supply line (dotted line in the figure) for supplying power.

Since the functional parts in the information processing apparatus 1 constitute a plurality of groups relating to the supply of power, initially the groups (hereunder, referred to as "power management domains") will be described.

The information processing apparatus 1 according to this invention performs power control that is based on a state in which power is not supplied to the functional parts, and only supplies power to allow processing to be performed when an operation is necessary. After processing finishes, the information processing apparatus 1 stops the supply of power again.

At this time, when executing processing in response to an input instruction, the information processing apparatus 1 takes functional parts that have a functionally close relationship, such as functional parts with a high possibility of operating at the same time or functional parts that perform a series of processing, as the same power management domain, and controls the supply of power to supply power to that power management domain independently of other power management domains.

By performing power control in this manner by taking functional parts having a functionally close relationship as the same power management domain, and performing power control that takes each functional part as an object, the information processing apparatus 1 is useful from the viewpoint of circuit scale and ease of control.

Based on the foregoing viewpoint, in the functional configuration shown in FIG. 2 are formed a CPU domain including the CPU 20; a non-volatile domain including a ROM 30, an NVRAM 40 and an SRAM (static RAM) 201 comprising a battery 203; a volatile domain including the RAM 50; a drawing domain including the GPU 61, the display controller 70 and the display 3; a memory card domain including the memory card controller 80; and a communication domain including the communication controller 90. The power management circuit 10 takes these respective domains as units, and autonomously controls the power supply to the power management domains.

When a user inputs an instruction to the information processing apparatus 1 by pressing the page back button 4, the page forward button 5, the list display button 6 or the enter button 7, a signal (event notification signal) that corresponds to the pressed button is input to the power management circuit 10. The power management circuit 10 then cooperates with the CPU 20 to supply power to only the power management domain that includes a functional part associated with execution of the input instruction. Further, the power management circuit 10 functions as a power supply control part that stops the supply of power to the power management domain in response to termination of execution of the instruction by the functional part.

The power management domain that was supplied with power writes the result generated by execution of the instruction in the SRAM 201 that is included in the non-volatile domain. The SRAM 201 functions as an execution result storage part, and stores a written result independently of the power management circuit 10 and the CPU 20 supplying power or stopping the supply of power to each power management domain. In this embodiment, information relating to a result generated by execution of an instruction is hereafter referred to as a "log record."

After the power supply is stopped to the power management domain that finished execution of the instruction, another power management domain that is supplied with power reads out the log record that is stored in the SRAM 201. This power management domain can refer to the log record to acquire information indicating whether the instructed processing ended normally or was halted by an error or the like.

Next, each functional part shown in FIG. 2 will be described.

The power management circuit 10 receives power that is supplied from an unshown battery, and supplies power to a predetermined power management domain.

More specifically, when the power management circuit 10 receives a button-depression signal from the page back button 4, the page forward button 5, the list display button 6, or the enter button 7, or a signal that detects connection of a communication cable in the communication connector 8 or connection of a memory card in the memory card slot 9, the power management circuit 10 supplies power to the CPU 20, to which the supply of power had been stopped. The power management circuit 10 then sends an event notification signal that describes the event that occurred to the CPU 20, to which the power supply was resumed and which is in an operating state.

When an instruction to supply power to any of the power management domains is received from the CPU 20, the power management circuit 10 supplies power to the relevant power management domain, and when an instruction to stop the supply of power to any of the power management domains is received from the CPU 20, the power management circuit 10 stops the power supply to the relevant power management domain.

The CPU 20 controls the entire information processing apparatus 1 and reads out and executes various programs that are stored in the ROM 30. For example, in response to various signals input via the power management circuit 10, the CPU 20 reads out from the ROM 30 programs for various kinds of processing for the system control processing of the information processing apparatus 1 to be described later, and executes the programs. The CPU 20 then stores various processing results in a predetermined area on the NVRAM 40 or the RAM 50.

The ROM 30 is composed of a non-volatile memory such as, for example, a flash ROM. An operating system program (OS) and application programs such as an electronic book viewer program are stored on the ROM 30.

The NVRAM 40 is composed of a non-volatile memory such as a FERAM (Ferroelectric Random Access Memory) or an MRAM (Magnetoresistive Random Access Memory). For example, when contents of an electronic book are being viewed, the NVRAM 40 stores data that it is necessary to store even when the power supply of the information processing apparatus 1 is cutoff, such as the page number of the page being viewed.

Although the SRAM 201 is a volatile memory device, it is equipped with a dedicated battery 203. It can thus store a log even when the power management circuit 10 and the CPU 20 stop the power supply to the non-volatile domain.

The NVRAM 40 can be composed by a non-volatile memory for which a backup by a power source is not required as described above, and a configuration can also be employed that adopts a pseudo-non-volatile memory by backing up a volatile memory such as an SRAM with a dedicated power source.

Naturally, the SRAM 201 may also be a device provided with a non-volatile memory device such as, for example, a FERAM (Ferroelectric Random Access Memory). In this case, the battery 203 is not required and the number of components of the configuration for storing a log can be reduced.

Although an independent SRAM is employed as the memory that stores a log according to this embodiment, an area for recording the log may be provided in one part of the NVRAM 40, and this area may be made to function as an execution result storage part.

The RAM 50 is composed by a volatile memory such as a DRAM (Dynamic Random Access Memory), an SRAM (Static Random Access Memory) or an SDRAM (Synchronous DRAM). The RAM 50 forms a work area when the CPU 20 executes processing, and also stores the processing result.

In this example a case was described in which the apparatus comprises the RAM 50 because consideration is given to processing speed, since the RAM 50 generally operates faster than the NVRAM 40. However, if an NVRAM 40 that operates at a higher speed can be used, a configuration can be adopted that does not comprise the RAM 50 and which uses the NVRAM 40 to also fulfill the function of the RAM 50.

The GPU 61 is hardware that performs high-speed drawing processing of an image displayed on the display 3 in accordance with an instruction of the CPU 20. More specifically, the GPU 61 performs processing such as expanding a vector graphic that was input from the CPU 20 into a raster graphic. The GPU 61 then outputs to the display controller 70 drawing data for drawing the graphic that underwent the drawing processing on the display 3.

In the configuration shown in FIG. 2, the GPU 61 contains a memory controller 202. The memory controller 202 functions as a write control part for writing a log record in the SRAM 201.

The display controller 70 directly controls the display 3 and displays drawing data that was input from the GPU 61 on the display 3.

More specifically, the display controller 70 refers to drawing data that was input from the GPU 61 and, by driving an X driver and a Y driver of the display 3, displays the raster graphic that is the drawing object on the display 3.

Figure 3:
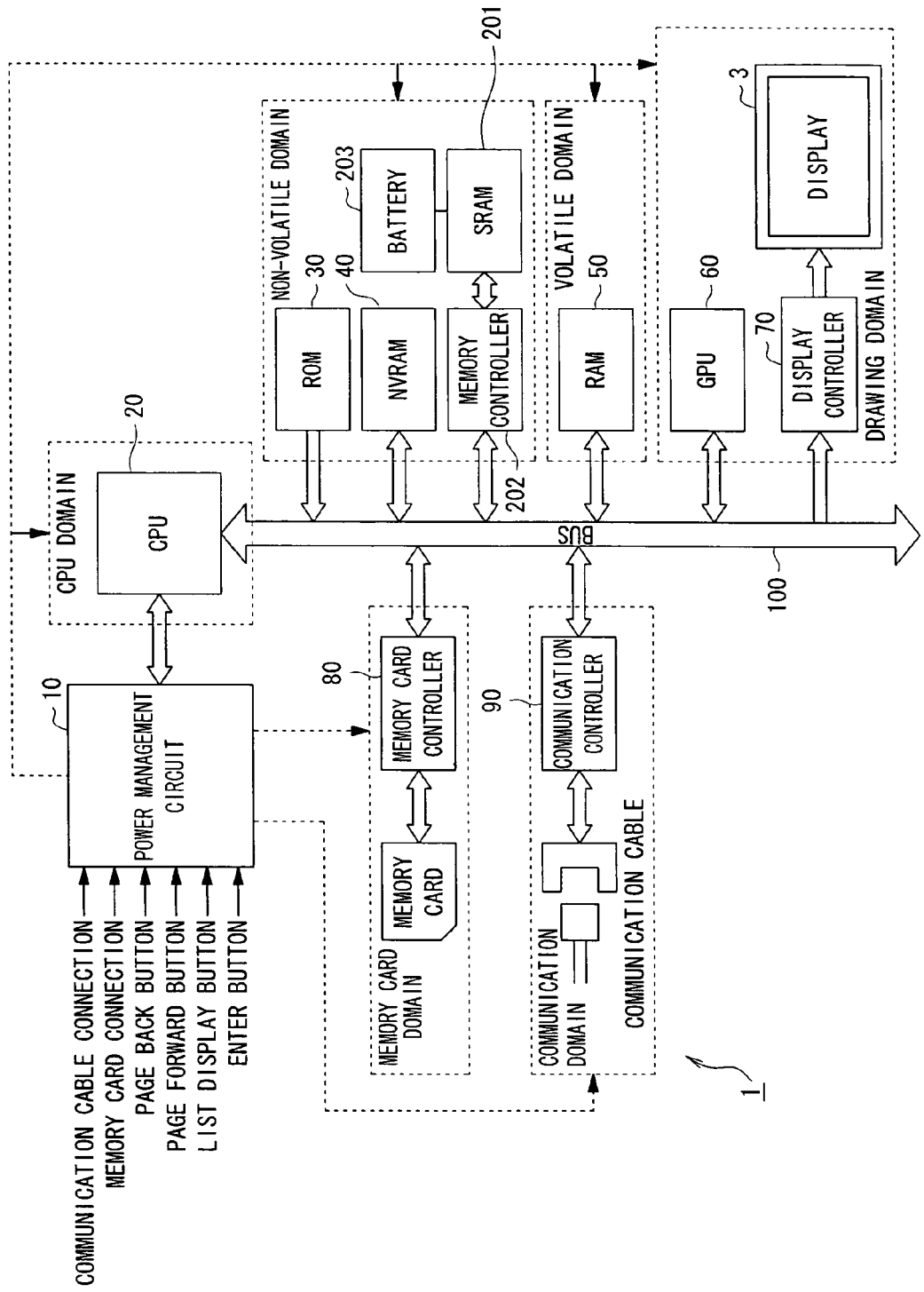
FIG. 3 is another functional block diagram showing an internal configuration of the information processing apparatus shown in FIG. 1.

Although FIG. 2 shows a configuration in which the GPU 61 contains the memory controller 202, the present embodiment is not limited thereto, and the memory controller 202 may be externally attached to the SRAM 201. FIG. 3 is a diagram showing the information processing apparatus of the present embodiment when it is configured in this manner.

According to the configuration shown in FIG. 3, a GPU 60 can write a log in the SRAM 201 in the same manner as the configuration shown in FIG. 2 by using a bus protocol that is established between itself and the memory controller 202 to write the log via a bus 100 and the memory controller 202. By adopting this configuration, the configuration of an image processing apparatus according to this embodiment can be realized without altering the existing configuration of the GPU 60.

Figure 4:
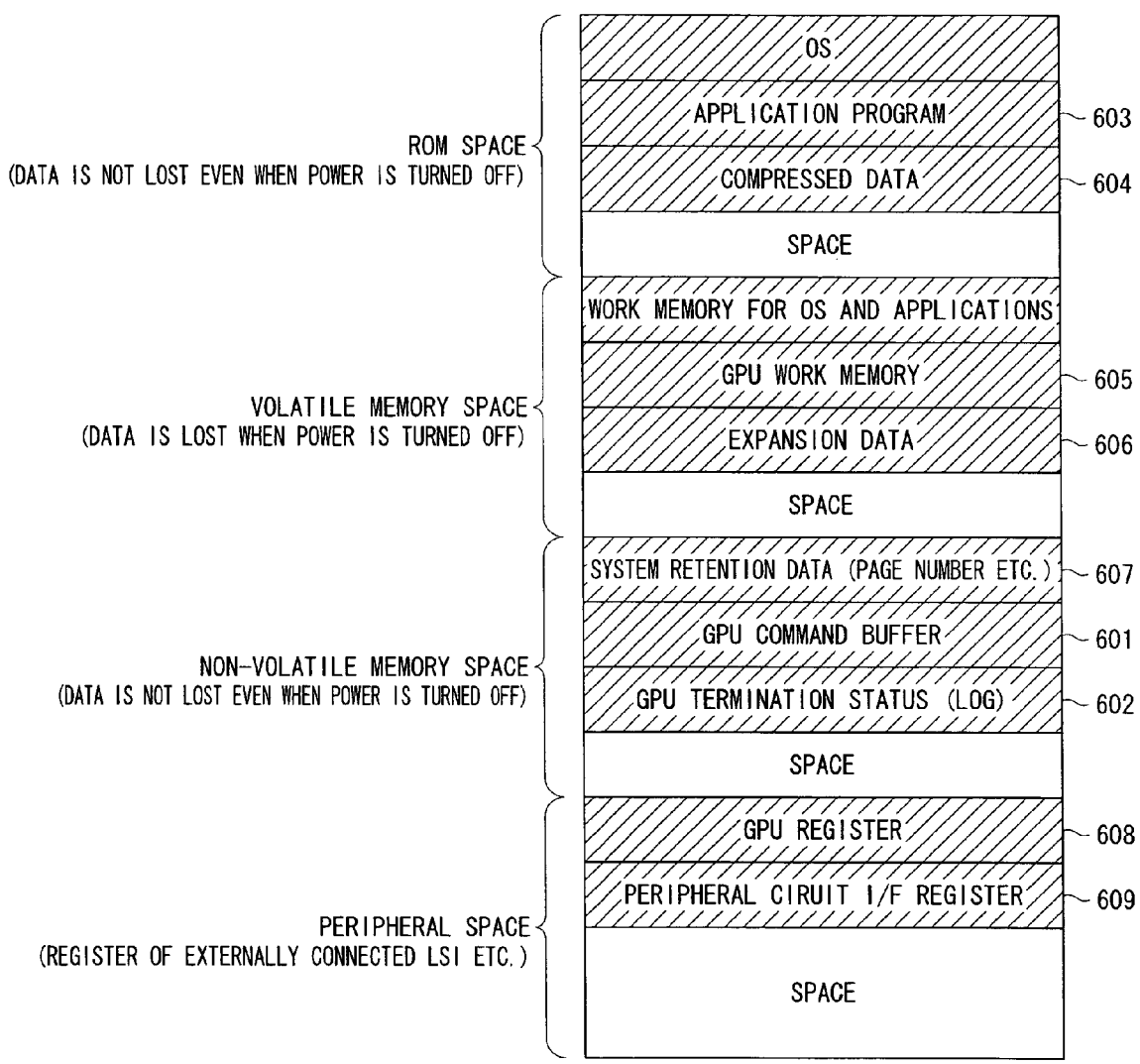
FIG. 4 is a view for describing memory space of the information processing apparatus according to an embodiment of this invention.

The memory space of the information processing apparatus 1 according to this embodiment will now be described using FIGS. 4 and 5. FIG. 4 is a view showing the memory space of the entire information processing apparatus 1, and FIG. 5 is a view that specifically shows one part of the memory space shown in FIG. 4.

As shown in FIGS. 2 and 3, the information processing apparatus 1 comprises memory devices including the ROM 30, the NVRAM 40, the SRAM 201 and the RAM 50. In addition to these memory devices, a register is also provided in the GPU 60 (GPU 61) or a peripheral circuit. In FIG. 4, the memory space of the ROM 30 is described as "ROM space," the memory space of volatile memory including the RAM 50 is described as "volatile memory space," the memory space of non-volatile memory including the SRAM 201 or the NVRAM 40 is described as "non-volatile memory space," and memory space including a register of the GPU 61 and the like is described as "peripheral space."

The storage area of the SRAM 201 is non-volatile memory space and it comprises a command buffer 601 in which a drawing instruction of the CPU 20 for the GPU 61 is written, and a log record area 602 in which the GPU termination status is written as a log record.

An application program 603 in the ROM space in FIG. 4 is a document display program for displaying a document on the display 3. Further, compressed data 604 is data in which image data of a document background or the like is compressed.

A GPU work memory 605 in the volatile memory space is a memory space that is temporarily used by the GPU 61 to expand (decode) an image. Further, expansion data 606 is a memory space that temporarily stores expanded data. The space required to decode an image or store a decoded image differs according to the scale and contents of the image in question. Therefore, in the information processing apparatus 1, there is a possibility of an error occurring in a process for decoding an image when an area that was set as a memory for storing the expansion data 606 or a GPU work memory is insufficient.

System retention data 607 is data that is required to be stored even when the power supply to various domains has been stopped, and it includes, for example, a page number. The GPU register is a space in which information required by the GPU 61 for executing a drawing instruction is written. An example of data written in the GPU register and the meaning thereof is described hereunder.

| | | |
|---|---|---|
| CMDADRS | [31:0] | Address in which drawing instruction command is stored. |
| CMDRUN | | Starts execution of command (any value may be written). |
| LOGMODE | [1:0] | Designates log output mode. [0:0] Log output is not performed. [0:1] Outputs log only at error occurrence. [1:0] Outputs log only at normal termination. [1:1] Outputs log at both error occurrence and normal termination. |
| LOGADRS | [31:0] | Address of memory to output log to. |

A peripheral circuit I/F register 609 is a memory space assigned as a register of information relating to the page forward button 4, communication or a memory card.

As shown in FIG. 5, the memory space shown in FIG. 4 defines the respective spaces of the compressed data 604, the GPU work memory 605 and the like by specifying the start of each address. In the example shown in FIG. 5, the start address of the GPU command buffer 601 is 0x20010000. A drawing instruction for the GPU 61 from the CPU 20 is written in the GPU command buffer 601. The GPU 61 reads out the drawing instruction written by the CPU 20 and executes processing to display an image on the display 3.

The command buffer exemplified in FIG. 5 is a drawing instruction that instructs the GPU 61 to decode compressed data that exists at the address 0x00020000 and store the resulting data from the address 0x10020000. Further, the exemplified drawing instruction instructs the GPU 61 to extract the data at (100, 100) to (299, 299) from the image data at the address 0x10020000, and overwrite the extracted data at (300, 300) to (499, 499) allocated in the memory space for storing the image to be displayed on the display 3. The meaning of the main commands among the commands included in the drawing instruction shown in FIG. 5 is shown in FIG. 6. The Finish instruction shown in FIG. 6 is a command that indicates the end of a drawing instruction and must be written at the end of an instruction.

According to the present embodiment, an area (amount of memory of the starting address or from the starting address to the ending address) assigned for writing a log in the memory space shown in FIG. 4 can be set, for example, by a power management domain (in this embodiment, the CPU 20) on the side that reads out a log that was written by the drawing domain.

By adopting this configuration, the memory of the information processing apparatus 1 can be utilized flexibly, and an area for writing a log can be surely allocated even when the amount of memory required for writing a drawing instruction varies in accordance with the type and scale of drawing processing and the like. The memory space can also be effectively used.

Next, the operations of the information processing apparatus 1 will be described. For the description of operations, a case is assumed for the above described configuration in which, for example, the page forward button 5 was pressed to input an event notification signal that causes the next page to be displayed.

Figure 7:
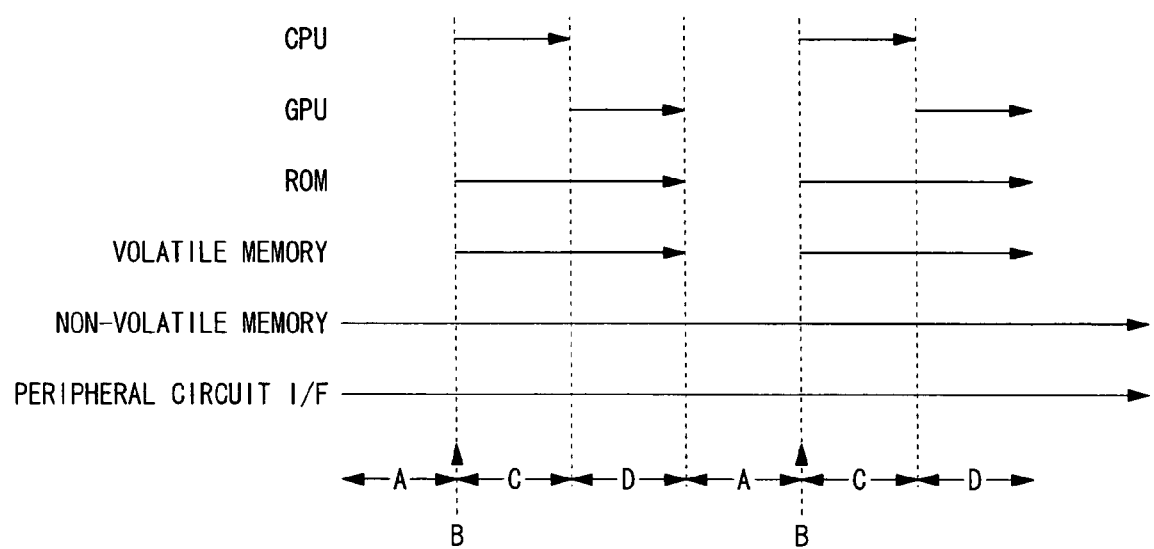
FIG. 7 is a view showing the power source control state of the information processing apparatus according to an embodiment of this invention.

FIG. 7 is a view showing the power source control state of the information processing apparatus 1 of the present embodiment. The arrows shown in the figure indicate the timing at which power is supplied to the CPU 20, the GPU 61, the ROM 30, the volatile memory including the RAM 80, the non-volatile memory including the SRAM 201, and the peripheral circuit I/F.

A reference character A shown in FIG. 7 denotes a timing at which the information processing apparatus 1 is not operated because the user is reading an image displayed on the display 3 or a similar reason. A reference character B denotes a timing at which the page forward button 5 or the page back button 4 was pressed. A reference character C denotes a timing at which the CPU 20 reads out data required for drawing the next page or the previous page from the memory card domain and writes a drawing instruction in the SRAM 201. A reference character D denotes a timing at which the GPU 61 reads out a command that was written in the SRAM 201 and draws an image on the display 3 in accordance with the command.

As shown in FIG. 7, according to the present embodiment, while a user is viewing an image displayed on the display 3 without operating the information processing apparatus 1, power is not supplied to any of the power management domains, the CPU domain, the drawing domain, or the volatile domain (A). Subsequently, when an event notification signal is input to the power management circuit 10 by the user operating the page forward button 5 or the like (B), the CPU 20 is turned on in response to input of the event notification signal (C)

When the CPU 20 is turned on, it decodes the event notification signal and instructs the power management circuit 10 to supply power to the power management domain that corresponds to the event notification. In this embodiment, after the CPU 20 stores a drawing instruction in the SRAM 201, it instructs the power management circuit 10 to supply power to the drawing domain.

After the drawing domain has executed the instruction, the power management circuit 10 continues the power supply to the drawing domain while the drawing domain is writing a log generated by execution of the instruction in the SRAM 201. After the result is written, the power management circuit 10 stops the power supply to the drawing domain.

By employing this configuration, it is possible to surely write a processing log in the SRAM 201. Further, after writing is completed, the drawing domain can be turned off to surely eliminate the consumption of unnecessary power.

Furthermore, in this embodiment the CPU 20, the GPU 61 and the SRAM 201 are connected at this time by the bus 100, and authorization to use the bus 100 is basically held by the CPU 20. Therefore, the GPU 61 acquires authorization to use the bus 100 and accesses the SRAM 201 by means of a so-called bus master access to write the log therein.

Figure 8:
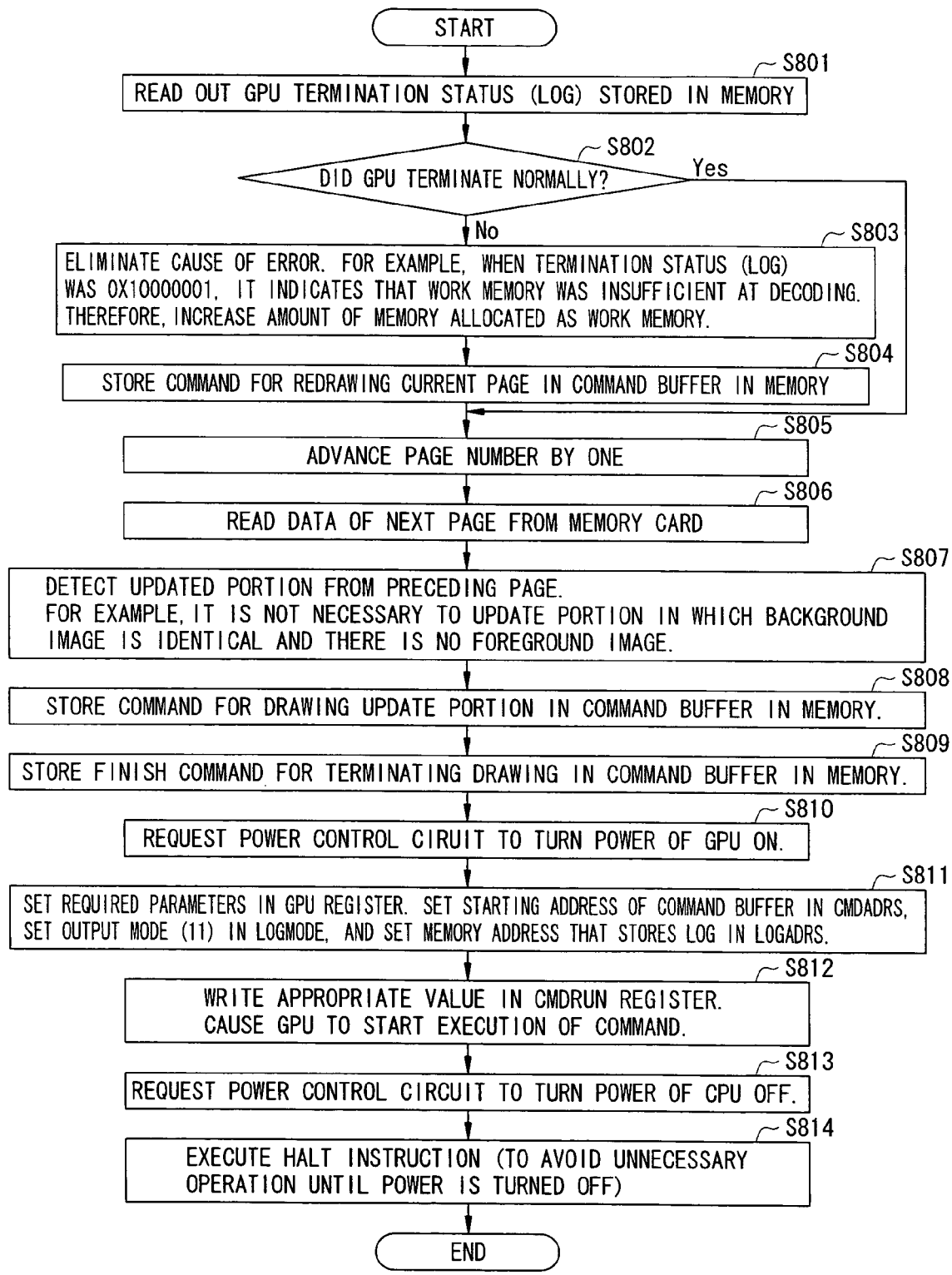
FIG. 8 is a flowchart for illustrating processing executed by the CPU at the timing indicated by reference character C in FIG. 7.

FIG. 8 is a flowchart for explaining processing that is executed by the CPU 20 at the timing denoted by the reference character C. As shown in the figure, the CPU 20 is on in the period denoted by reference character C, and starts processing (for this flowchart it is assumed that an instruction to turn the page was input). In order to first check the termination result of the previous processing performed by the GPU 61, the CPU 20 reads out the log of the GPU 61 that is stored in the SRAM 201 (step S801).

The log is recorded in a predetermined area of the SRAM 201. The relation between the recording area and data in the SRAM 201 will be described later.

Next, the CPU 20 determines whether or not the previous processing performed by the GPU 61 ended normally based on the log that was read out (step S802). When the CPU 20 determines as a result that the processing ended normally (step S802: Yes), it advances by one the page number showing the page that is displayed on the display 3 (step S805).

In contrast, in step S802, when the log record indicates that an error occurred in the processing of the GPU 61 (step S802: No), the CPU 20 removes the cause of the error (step S803). The CPU 20 then writes a command for re-executing the drawing processing in which the error occurred in the GPU command buffer 601 again (step S804).

For example, when 0x10000001 is described as the log record, this log record indicates that the area set as the GPU work memory 605 of the SRAM 201 was insufficient when the GPU 61 decoded the compressed data from the SRAM 201. In this case, the CPU 20 increases the memory space amount allocated to the GPU work memory 605 and resets the area. In this connection, the specific method for removing an error will differ according to the cause of the error occurrence. Therefore, processing to remove an error is not limited to the processing described above, and suitable processing that corresponds to the error can be performed.

When drawing the next page, when a common portion exists with respect to the image that was previously displayed and the image to be displayed next, the information processing apparatus 1 according to this embodiment performs only part drawing to draw a part other than that common portion. Part drawing is an effective technique for enhancing the rewriting speed of a memory display that has an unfavorable rewriting speed.

Figure 9C:
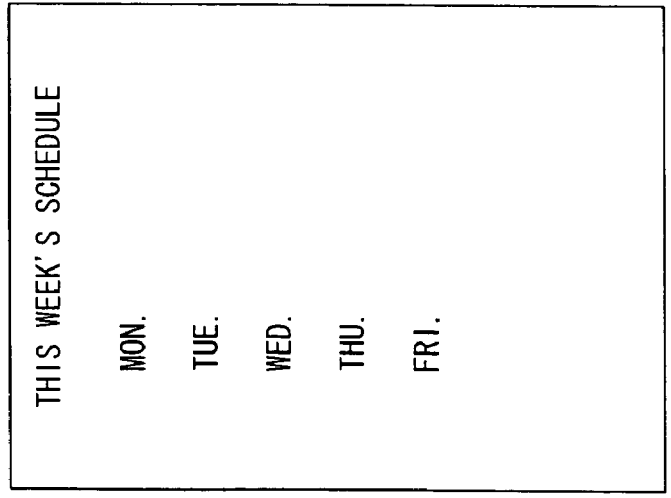
FIGS. 9A to 9C are views for explaining an image that is drawn with the information processing apparatus according to an embodiment of this invention.
Figure 9B:
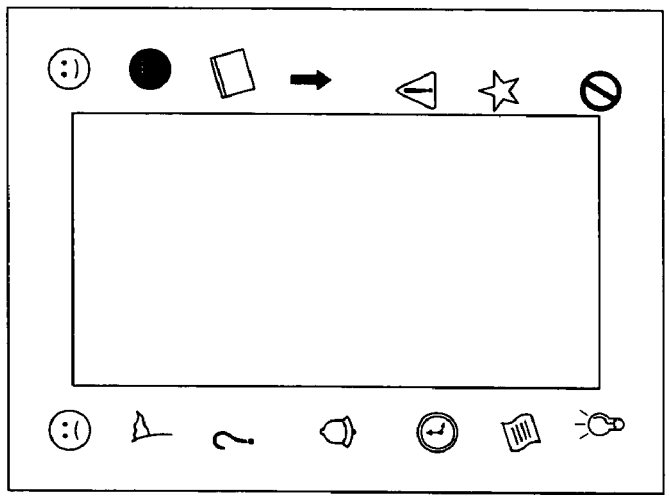
Figure 9A:
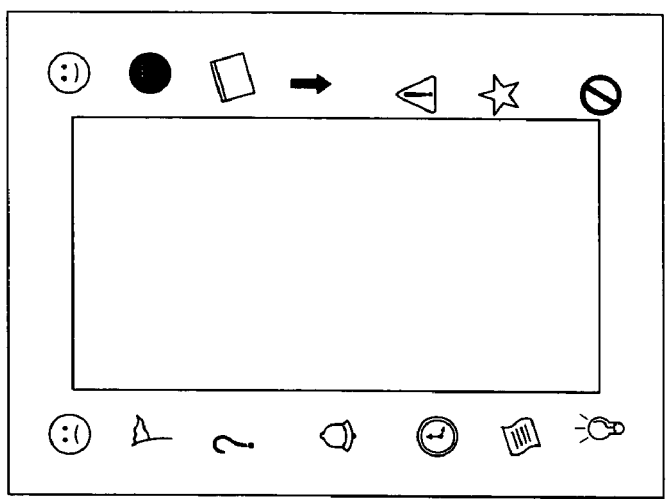

As shown in FIGS. 9A to 9C, according to the information processing apparatus of this embodiment an entire image (FIG. 9C) is formed by an image that shows text (foreground image) (FIG. 9A) and an image that is the background to the text image (background image) (FIG. 9B). The background image is stored as compressed data in the ROM space.

When employing part drawing, the CPU 20 reads out data of an image to be drawn on the next page from a memory card (S806). The CPU 20 then compares the page that was drawn up to that time with the thus read next page, and detects images that are updated for rewriting (step S807). When the result determined in step S807 is, for example, that on both the preceding page and the next page the background image is the same and there is no foreground image, the CPU 20 determines that there is no necessity to update the currently displayed image.

When it is necessary to update the image, the CPU 20 stores a command instructing the GPU 61 to draw the update part in the command buffer of the SRAM 201 (step S808). Thereafter, the CPU 20 stores a Finish command that signifies the termination of drawing in the command buffer of the SRAM 201 (step S809).

In some cases an image for which drawing failed will be displayed on the display 3 when an error occurred during decoding. This kind of image is referred to as so-called "garbage", and it noticeably deteriorates the image quality on the display 3. According to the processing of the present flowchart, even when garbage was generated it is possible to prevent a reduction in the image quality by redrawing the image in the next processing.

Next, the CPU 20 requests the power management circuit 10 to turn on the power of the GPU 61 (step S810). The CPU 20 then sets the parameters necessary for processing in the register of the GPU 61 (step S811). At this time, the CPU 20 sets the starting address of the command buffer, the log output mode, and the memory address at which the log is recorded.

The CPU 20 causes the GPU 61 to start processing based on the drawing instruction by writing an appropriate value in the CMDRUN register (step S812). Thereafter, the CPU 20 requests the power management circuit 10 to turn off the power of the CPU 20 itself (step S813), and executes a HALT instruction until the power is turned off (step S814).

As described above, the information processing apparatus 1 according to this embodiment can store in the SRAM 201, independently of a power supply or power supply stoppage, a log that is a result generated by execution of an instruction by a drawing domain that was supplied with power. The CPU 20 reads out the stored log to determine in subsequent processing whether or not execution of the instruction was performed properly, and can thus perform processing to deal with inappropriate termination of the instruction.

The program for causing a computer to execute a power control method according to the present embodiment as described above can be provided by recording a file containing the program code in an installable format or an executable format on a computer-readable recording medium such as a CD-ROM, a floppy (registered trademark) disk (FD), or a DVD. The program for causing a computer to execute a power control method according to this embodiment may also be provided by recording the program code on a computer-readable memory device such as a ROM, a flash memory, a memory card, or a USB connection-type flash memory. Further, the program for causing a computer to execute a power control method according to this embodiment may also be provided by storing the program code on a computer that is connected to a network such as the Internet and allowing users to download the program code via the network.

The present embodiment as described above can provide an information processing apparatus that reduces power consumption by stopping a power supply to one part of the apparatus, in which the CPU 20 can know the result of an operation carried out by a drawing domain including a control part GPU that is used exclusively for drawing.

Further, since power can be supplied to only a drawing domain that includes a GPU associated with execution of an input instruction, and the power supply to the drawing domain can be stopped in response to terminating execution of the instruction, the power supply to a drawing domain that is not operating can be completely stopped to enable an effective reduction in the power consumption of the apparatus overall.

What is claimed is:

1. An information processing apparatus that has multiple functional parts and power management domains that serve as control units when supplying power to the functional parts, and that autonomously controls supply of power to the power management domains, the apparatus comprising:
   a power supply control part that supplies power to only a power management domain that includes the functional part associated with execution of an input instruction, and that stops the power supply to the power management domain in response to termination of execution of an instruction by the functional part; and
   an execution result storage part that stores log record indicating whether the instructed processing ended normally by execution of an instruction by the power management domain to which power is supplied by the power supply control part, independently of the power supply control part supplying power and stopping the supply of power;
   wherein, an SRAM functioning as the execution result storage part is equipped with a dedicated battery, and after supply of power to a power management domain that terminates execution of an instruction is stopped by the power supply control part, another power management domain to which power is supplied by the dedicated battery reads out a log record that is stored in the SRAM, determines whether the instructed processing ended normally by execution of an instruction, and when the instructed processing did not end normally by execution of the instruction, the apparatus removes the cause of the not normally ending processing and writes a command for re-executing.

2. The information processing apparatus according to claim 1, wherein the execution result storage part is a nonvolatile memory device or a volatile memory device equipped with a power source, which stores the log record even after the power supply control part stops a supply of power to a power management domain that executes the instruction.

3. The information processing apparatus according to claim 1, wherein the power supply control part supplies power to a power management domain during a period in which the power management domain that terminates execution of an instruction writes the log record in the execution result storage part, and stops supplying power to the power management domain after the log record is written.

4. The information processing apparatus according to claim 1, wherein at least one of the power management domains sets an area in the execution result storage part in which the log record is to be written.

5. The information processing apparatus according to claim 1, wherein the dedicated battery is only connected to the SRAM.

6. The information processing apparatus according to claim 1, wherein the power management domain and the execution result storage part are connected by a bus, and the power management domain acquires an authorization to use the bus and writes the log record in the execution result storage part.

7. The information processing apparatus according to claim 6, wherein the execution result storage part comprises a write control part for writing the log record and when the power management domain is connected to the write control part via the bus, the power management domain writes the log record using a bus protocol that is established between the write control part and the power management domain.

8. A computer readable storage medium having a computer-executable program embedded thereon, the program for causing a computer to execute a power control method, the computer having multiple functional parts and power management domains that serve as control units when supplying power to the functional parts, and autonomously controlling a supply of power to the power management domains, the program, when executed by the computer to perform the method comprising:
   a power supply control step that supplies power to only a power management domain that includes the functional part associated with execution of an input instruction, and that stops the power supply to the power management domain in response to termination of execution of an instruction by the functional part; and
   an execution result storage step that stores log record indicating whether the instructed processing ended normally by execution of an instruction by the power management domain to which power is supplied by the power supply control step, independently of the power supply control step supplying power and stopping the supply of power;
   wherein, an SRAM functioning as the execution result storage step is equipped with a dedicated battery, and after supply of power to a power management domain that terminates execution of an instruction is stopped by the power supply control step, another power management domain to which power is supplied by the dedicated battery reads out a log record that is stored in the SRAM, determines whether the instructed processing ended normally by execution of an instruction, and when the instructed processing did not end normally by execution of the instruction, the computer removes the cause of the not normally ended processing and writes a command for re-executing.

* * * * *